(12) United States Patent
Sytek et al.

(10) Patent No.: US 9,115,524 B1
(45) Date of Patent: Aug. 25, 2015

(54) CLOSURE DAMPENING BUMPER

(71) Applicants: Christopher Sytek, Burton, MI (US); Tiffany L Frederick, Royal Oak, MI (US); Christopher J Duke, White Lake, MI (US)

(72) Inventors: Christopher Sytek, Burton, MI (US); Tiffany L Frederick, Royal Oak, MI (US); Christopher J Duke, White Lake, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/268,365

(22) Filed: May 2, 2014

(51) Int. Cl.
  *E05F 5/02* (2006.01)
  *B62D 25/12* (2006.01)

(52) U.S. Cl.
  CPC ............... *E05F 5/022* (2013.01); *B62D 25/12* (2013.01)

(58) Field of Classification Search
  CPC ........... B62D 25/12; E05F 5/022; E05F 5/025
  USPC ................... 296/207, 56, 76, 146.11, 146.8; 16/86 R, 86 A, 86 B
  See application file for complete search history.

(56) References Cited

U.S. PATENT DOCUMENTS

| | | | | |
|---|---|---|---|---|
| 5,584,099 | A * | 12/1996 | Westerdale | 16/245 |
| 5,873,619 | A * | 2/1999 | Lewkoski et al. | 296/76 |
| 7,815,241 | B2 | 10/2010 | Renke et al. | |
| 8,517,448 | B2 | 8/2013 | Krajenke et al. | |
| 8,978,203 | B2 * | 3/2015 | Krajenke et al. | 16/86 R |
| 2010/0109371 | A1 * | 5/2010 | Shoemaker et al. | 296/76 |
| 2012/0324795 | A1 | 12/2012 | Krajenke et al. | |
| 2013/0048399 | A1 * | 2/2013 | Krajenke et al. | 180/89.1 |
| 2013/0119698 | A1 * | 5/2013 | Patzer et al. | 296/146.12 |
| 2014/0333087 | A1 * | 11/2014 | Krajenke et al. | 296/76 |

* cited by examiner

*Primary Examiner* — Jason S Morrow
(74) *Attorney, Agent, or Firm* — Ralph E Smith

(57) ABSTRACT

A closure dampening bumper includes a base, a pair of guide walls extending from the base, and a plurality of beams extending from outer surfaces of the guide walls. The base is operable to define a stop-bumper for a moving structure, such as a gooseneck. The guide walls extend from the base and have respective inner and outer surfaces. The inner surfaces taper outward from one another. The distance between the inner surfaces increases from the base to respective distal ends of the guide walls. The guide walls are operable to receive the moving structure between the inner surfaces. The guide walls guide the moving structure to the base. The beams extend from the outer surfaces of the pair of guide walls. The beams elastically deform to dampen the energy associated with the moving structure during passage between the inner surfaces.

18 Claims, 4 Drawing Sheets

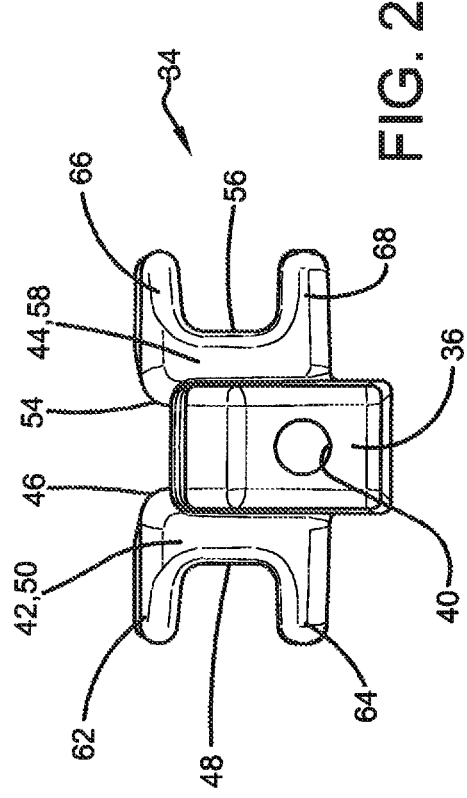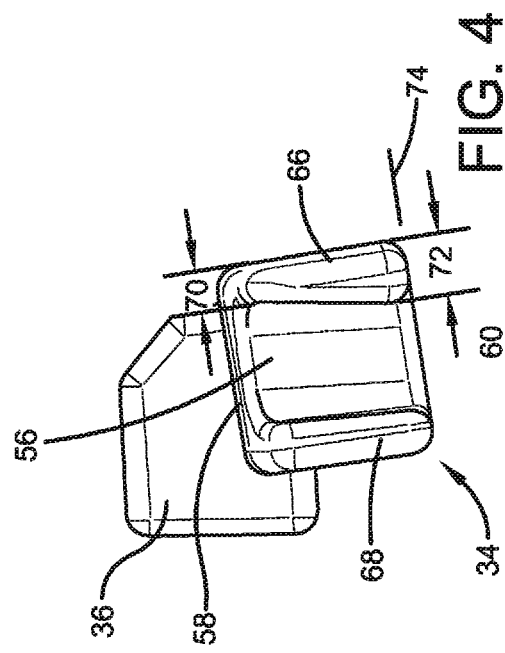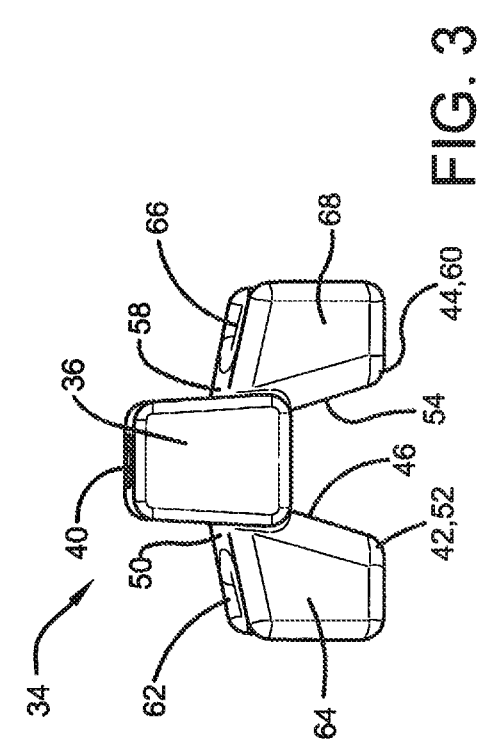

CLOSURE DAMPENING BUMPER

FIELD

The present disclosure relates generally to bumpers for hinge assemblies and, more particularly, to bumpers associated with gooseneck hinge assemblies for vehicles.

BACKGROUND

A decklid is pivotally moved to selectively open and close the trunk of a vehicle. Decklids are often biased toward an open position so that the vehicle operator can remove items from the trunk without having to concurrently maintain the decklid in the open position. However, the force applied by any biasing device must be dampened at the end of the motion stroke. If not, portions of the hinges that mount the decklid to the vehicle may interact with excessive force, causing damage or rebounding. Dampening involves slowing the motion of the decklid and eliminating vibration and noise caused when metallic portions of the hinges come into contact with one another. Torsion springs can be associated with the hinges and can be tuned to slow the motion of the decklid at the end of the motion stroke. Also, a non-metallic stop-bumper can be positioned at appropriate locations to prevent metal-to-metal contact between portions of the hinges. However, these structures add cost and complexity to the vehicle. A simplified, unitary stop-bumper and motion dampener can be applied, but these structures can cause binding. Thus, there remains a need for improvement in the relevant art.

SUMMARY

In one form, a closure dampening bumper is provided in accordance with the teachings of the present disclosure. In an exemplary embodiment, the closure dampening bumper includes a base, a pair of guide walls extending from the base, and a plurality of beams extending from outer surfaces of the guide walls. The base is operable to define a stop-bumper for a moving structure, such as a gooseneck. The pair of guide walls extends from the base and has respective inner and outer surfaces. The inner surfaces taper outward from one another. The distance between the inner surfaces increases from the base to respective distal ends of the guide walls. The pair of guide walls is operable to receive the moving structure between the inner surfaces. The guide walls guide the moving structure to the base. The beams extend from the outer surfaces of the pair of guide walls. The beams elastically deform to dampen the energy associated with the moving structure during passage between the inner surfaces.

In another form, a gooseneck hinge assembly is provided in accordance with the teachings of the present disclosure. In an exemplary embodiment, the gooseneck hinge assembly includes a hinge box, a gooseneck pivotally moveable about a pivot axis relative to the hinge box, and a closure dampening bumper. The hinge box includes a pair of side walls spaced from one another and is operable to be connected to a vehicle. The gooseneck is pivotally moveable between the side walls and is operable to be connected to a decklid of the vehicle. The closure dampening bumper includes a base positioned between the side walls. The base defines a stop-bumper for the gooseneck. The closure dampening bumper also includes a pair of guide walls extending from the base. The guide walls have respective inner and outer surfaces. The inner surfaces taper outward from one another. The distance between the inner surfaces increases from the base to respective distal ends of the guide walls. The guide walls are operable to receive and guide the gooseneck to the base during the pivoting movement. The closure dampening bumper also includes a plurality of beams extending from the outer surfaces of each guide wall. The beams elastically deform to dampen energy associated with the gooseneck during passage between the inner surfaces.

In some implementations, the number, shapes, and arrangements of the beams can be varied to adjust the dampening. For example, the same number of beams can be positioned on each outer surface or a different number of beams can be positioned on the different outer surfaces. In addition, the thickness of the beams can be varied. Beams of substantially constant width can be paired with beams of variable width on the same outer surface.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 2 is a top view of an exemplary closure dampening bumper according to the principles of the present disclosure;

FIG. 3 is a front view of the exemplary closure dampening bumper according to the principles of the present disclosure;

FIG. 4 is a side view of the exemplary closure dampening bumper according to the principles of the present disclosure;

DESCRIPTION

Figure 1:
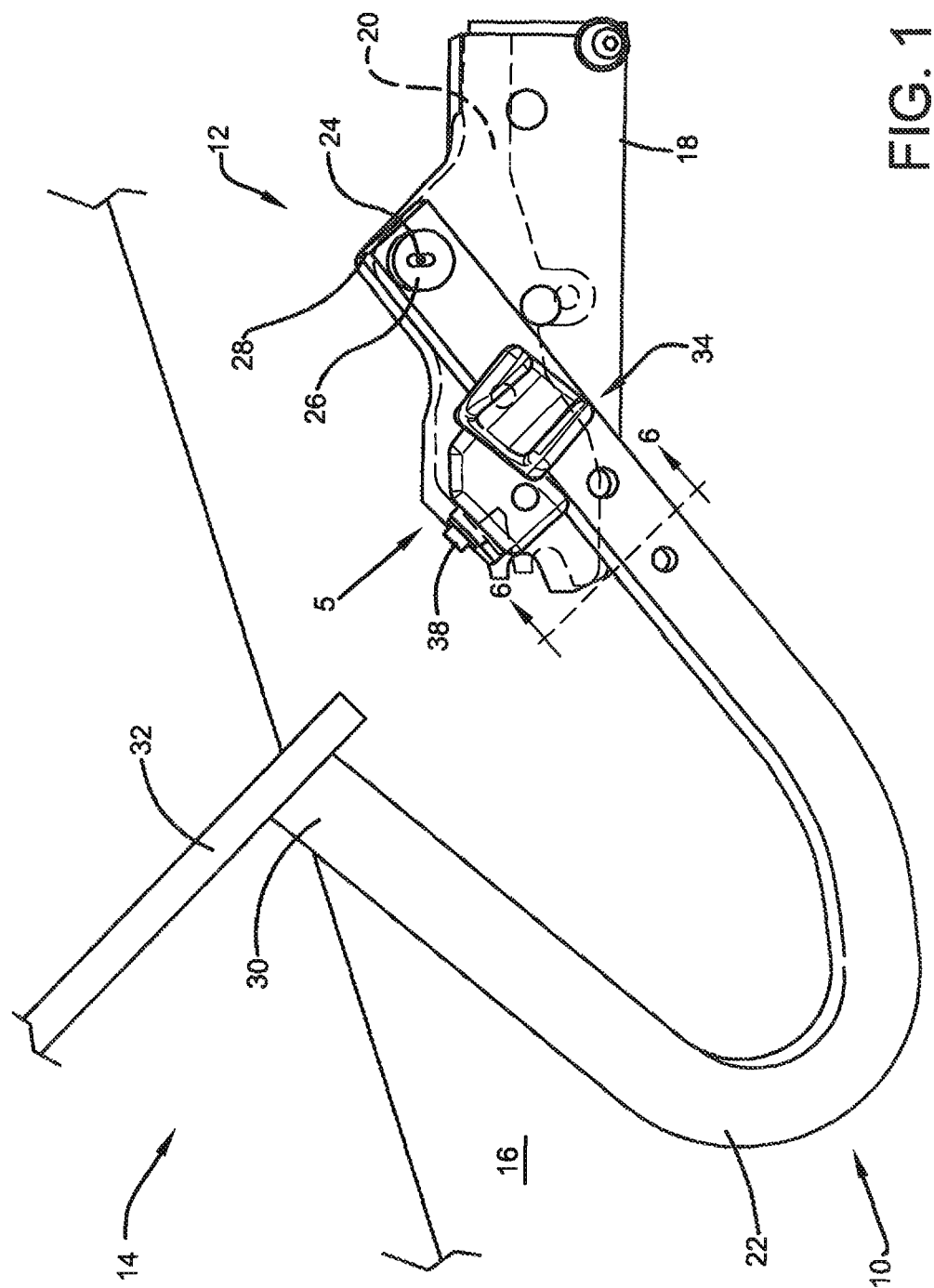
FIG. 1 is a side view of an exemplary gooseneck hinge assembly from within a trunk of a vehicle according to the principles of the present disclosure.

With initial reference to FIG. 1, an exemplary gooseneck hinge assembly 10 is provided in accordance with the teachings of the present disclosure. In the exemplary implementation illustrated, the gooseneck hinge assembly 10 includes a hinge box 12 operable to be connected to a vehicle 14. The rear portion of the vehicle 14 is shown in FIG. 1. The exemplary hinge box 12 is mounted in the trunk 16 of a vehicle 14. The hinge box 12 includes a pair of side walls 18, 20 laterally spaced from one another. The side wall 20 is shown in phantom to enhance the clarity of the internal structure of the exemplary hinge box 12.

With continued reference to FIG. 1, the exemplary gooseneck hinge assembly 10 includes a gooseneck 22 pivotally moveable about a pivot axis 24 relative to the hinge box 12. The gooseneck 22 is pivotally moveable between the side walls 18, 20. The pivot axis 24 is defined by a bolt 26 passing through the side walls 18, 20 and through an inner end 28 of the gooseneck 22. The gooseneck 22 extends between the inner end 28 and an outer end 30. At the outer end 30, the gooseneck 22 is connected to a decklid 32 of the vehicle 14.

With continued reference to FIG. 1, the decklid 32 is pivotally moved relative to the vehicle 14 to selectively open and close the trunk 16. A motion stroke of the gooseneck 22 is defined by the movement of the gooseneck 22 between two end limits of travel. The decklid 32 is in the closed position when the gooseneck 22 is at the first end limit of travel. The decklid 32 is in the open position when the gooseneck 22 is at the second end limit of travel, shown in FIG. 1. The exemplary decklid 32 is biased toward the open position by a biasing device. A biasing device is not shown in FIG. 1, as any form of biasing device may be applied in various embodiments of the present disclosure. The force applied by the biasing device accelerates the gooseneck 22 toward the second end limit of travel. This force is dampened at the end of the motion stroke. If the force is not dampened, the gooseneck 22 and the hinge box 12 would interact or collide with a potentially undesirable level of force. Such interaction can cause damage or rebounding.

With continued reference to FIG. 1, dampening includes preventing the vibration and noise arising from the gooseneck 22 and the hinge box 12 coming into contact with one another at the end of the motion stroke. Dampening also includes slowing the motion of the gooseneck 22 prior to the gooseneck 22 reaching the end of the motion stroke. The exemplary gooseneck hinge assembly 10 includes an exemplary closure dampening bumper 34 to dampen the motion of the gooseneck 22. The exemplary closure dampening bumper 34 is an integrally formed structure formed from rubber, an elastomer, or any other suitable dampening material.

With continued reference to FIG. 1 and initial reference to FIGS. 2-4, the closure dampening bumper 34 includes a base 36 which defines a bumper for a moving structure, such as the gooseneck 22. The base 36 prevents the gooseneck 22 and the hinge box 12 from coming into contact with one another at the end of the motion stroke. The base 36 is fixedly mounted to the hinge box 12 with a bolt 38. The bolt 38 is received in an aperture 40. The base 36 is internal of and spaced from the pair of side walls 18, 20.

With continued reference to FIGS. 1 and 2-4, the closure dampening bumper 34 includes a pair of guide walls 42, 44. The guide walls 42, 44 extend from the base 36 and are internal of and spaced from the pair of side walls 18, 20. The guide wall 42 includes an inner surface 46 and an outer surface 48. The guide wall 42 extends between a base end 50 and a distal end 52. The guide wall 44 includes an inner surface 54 and an outer surface 56. The guide wall 44 extends between a base end 58 and a distal end 60.

Figure 5:
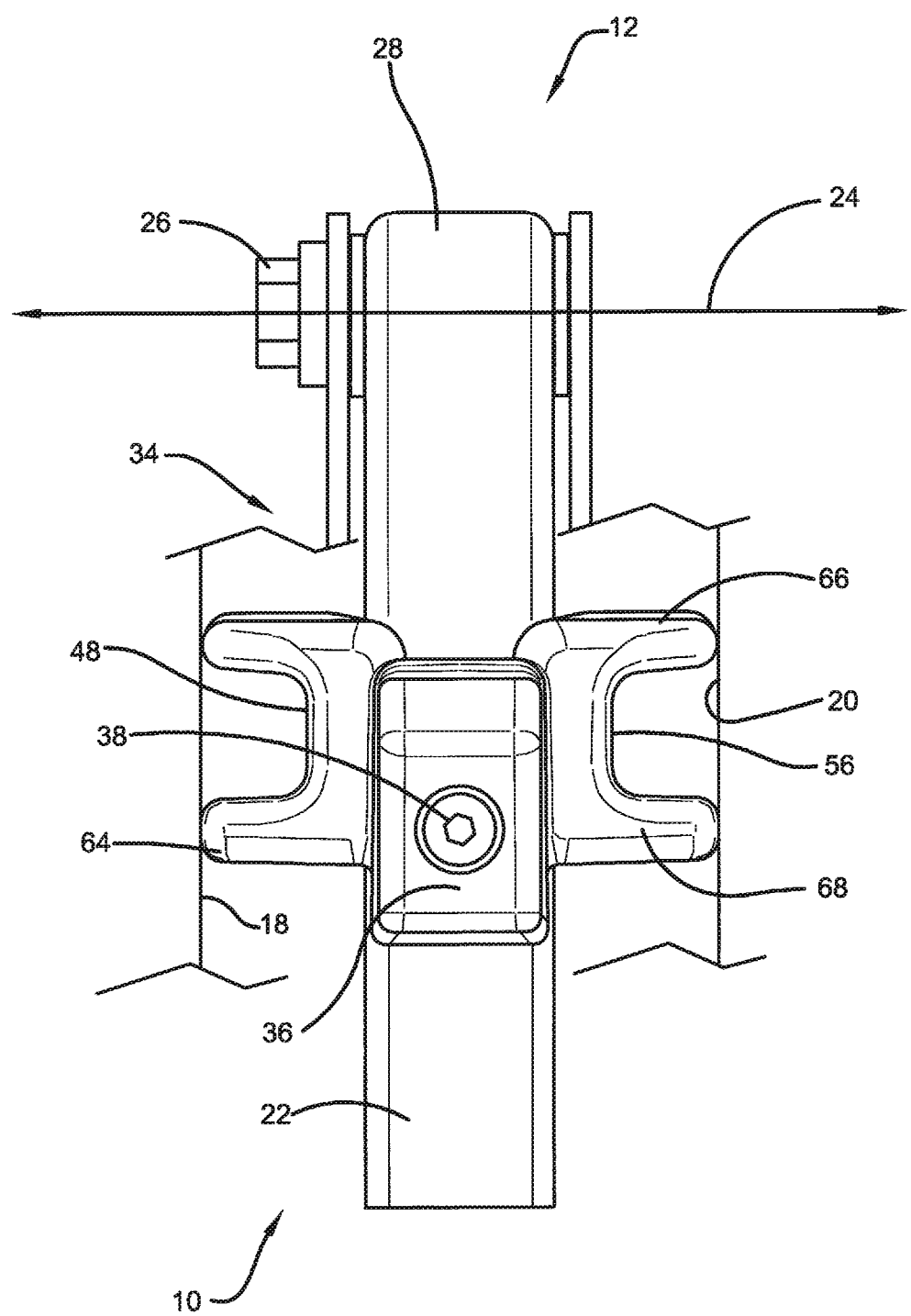
FIG. 5 is a view of the exemplary gooseneck hinge assembly taken from perspective line 5 in FIG. 1.
Figure 6:
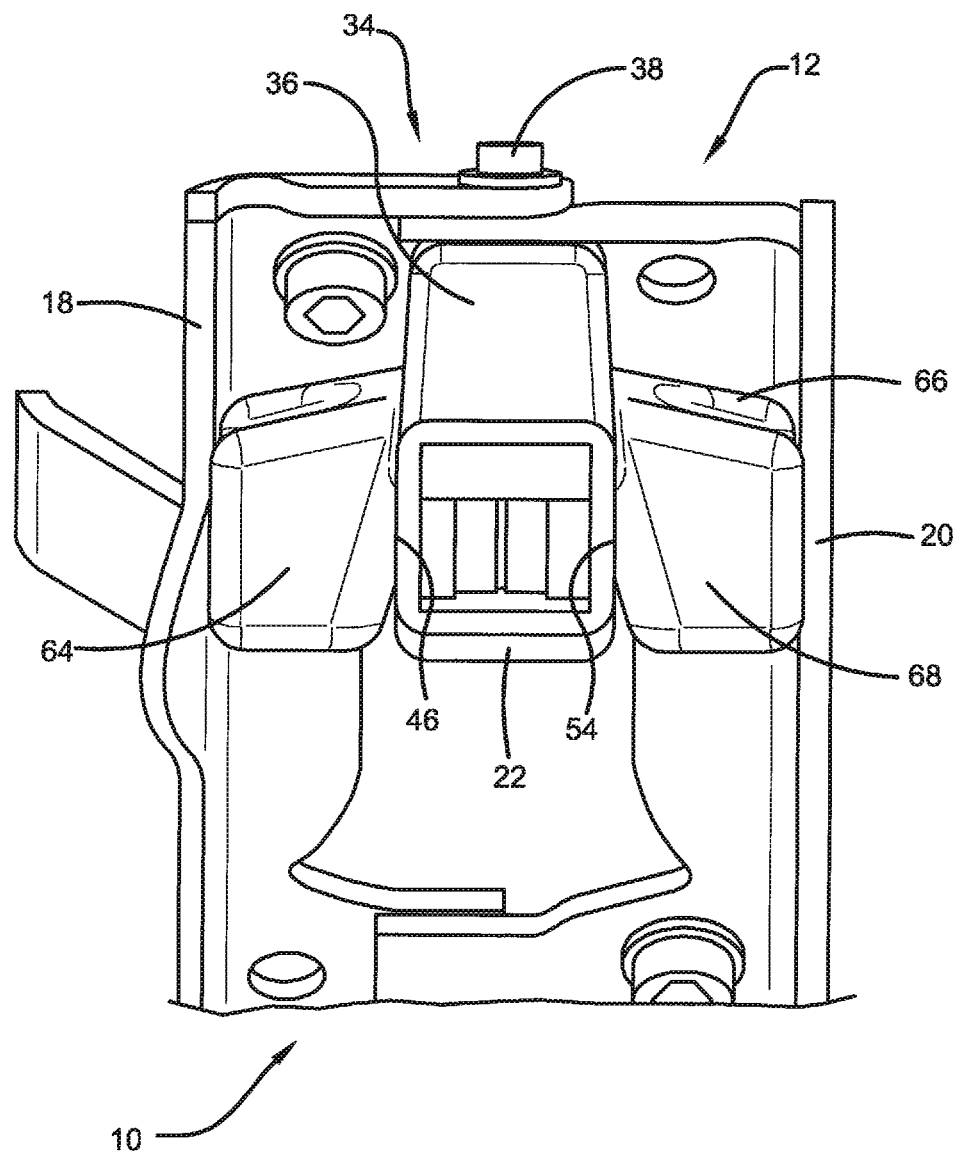
FIG. 6 is a partial cross-sectional view of the exemplary gooseneck hinge assembly from section lines 6-6 in FIG. 1.

With continued reference to FIGS. 2-4 and initial reference to FIGS. 5 and 6, the inner surfaces 46, 54 taper outward from one another. A distance between the inner surfaces 46, 54 increases from the base 36 to respective distal ends, 52, 60 of the guide walls 42, 44. The guide walls 42, 44 receive the gooseneck 22 between the inner surfaces 46, 54 and guide the gooseneck 22 to the base 36. As the distance between the gooseneck 22 and the base 36 diminishes, the area of contact between the gooseneck 22 and inner surfaces 46, 54 increases. Further, as the distance between the gooseneck 22 and the base 36 diminishes, the gooseneck 22 urges the guide walls 42, 44 outward, toward the side walls 18, 20. This causes elastic deformation in the guide walls 42, 44, dissipates energy, and dampens the motion of the gooseneck 22. It is noted that in FIG. 5, a top of the hinge box 12 has been removed for clarity of the closure dampening bumper 34. The base 36 acts as a positive stop and stop-bumper between the gooseneck 22 and the hinge box 12. At the end of the motion stroke, the gooseneck 22 contacts the base 36.

With continued reference to FIGS. 2-4, a plurality of beams extends from the outer surfaces 48, 56 of the pair of guide walls 42, 44. Exemplary beams 62 and 64 extend from the outer surface 48 of the guide wall 42. Exemplary beams 66 and 68 extend from the outer surface 56 of the guide wall 44. Each of the plurality of beams 62, 64, 66, 68 is elastically deformable to dampen energy associated with the gooseneck 22 during passage between the inner surfaces 46, 54.

With continued reference to FIGS. 1 and 2-4, the arrangement of the guide walls 42, 44 with the beams 62, 64, 66, 68 allows for more energy to be transferred from the gooseneck 22, relative to a dampening arrangement having just guide walls. Both the guide walls 42, 44 and the beams 62, 64, 66, 68 can deform to absorb energy. Further, the beams 62, 64, 66, 68 increase the stability of the overall dampening structure by allowing deflection/deformation to occur in different planes. For example, the beams 62, 64, 66, 68 can undergo column or straight-line compression or can buckle to dissipate energy. Also, the inclusion of the beams 62, 64, 66, 68 reduces the likelihood of binding between the gooseneck 22 and the guide walls 42, 44 since the guide walls 42, 44 can more easily be shifted outward by compression or buckling of the beams 62, 64, 66, 68.

Each of the beams 62, 64, 66, 68 reduces the likelihood of binding between the guide walls 42, 44 and the gooseneck 22. If binding should arise, one or more of the beams 62, 64, 66, 68 can deflect and allow one or more of the guide walls 42, 44 to give and thereby reduce the level of friction between the guide walls 42, 44 and the gooseneck 22. Also, the inclusion of the beams 62, 64, 66, 68 reduces the likelihood of the rebounding. Rebounding occurs if the gooseneck 22 collides with the base 36 and bounces back. The guide walls 42, 44 need not be overly stiffened to prevent rebounding since the beams 62, 64, 66, 68 cooperate with the guide walls 42, 44 to deflect and dampen motion.

With continued reference to FIGS. 2-4, the plurality of beams 62, 64, 66, 68 includes pairs of spaced beams extending from each of the outer surfaces. Beams 62 and 64 form a first pair and beams 66 and 68 form a second pair. Thus, a similar number of beams 62, 64, 66, 68 extend from each of the outer surfaces 48, 56. An alternative embodiment of the present disclosure can include different numbers of beams extending from the outer surfaces 48, 56, such as one beam extending from the outer surface 48 of the guide wall 42 and two beams extending from the outer surface 56 of the guide wall 44. Also, an alternative embodiment of the present disclosure can include more than two beams extending from an outer surface or a single beam extending from an outer surface.

With continued reference to FIGS. 2-4, the width of the beams and the number of beams can be varied to achieve a desired dampening of movement. Further, the width of one or more particular beams can be varied. The beams 62 and 66 have variable width. The exemplary widths of the beams 62 and 66 are defined in a direction transverse to the direction of movement of the gooseneck 22 into the gap between the guide walls 42, 44. Different widths of the beam 66 are referenced at 70 and 72.

With continued reference to FIG. 4, the width 72 is greater than the width 70. Thus, the beam 66 narrows in a direction parallel to the outer surface 56. The widest portion of the beam 66, the width 72, is proximate to a plane of entry of the gooseneck 22 between the guide walls 42, 44. This plane extends into and out of the view shown in FIG. 4 and is referenced by line 74. The beam 62 is similarly configured. The widest portion of the beam 66 provides the largest resistance deformation when the gooseneck 22 enters the gap between the guide walls 42, 44. Also, the gooseneck 22 is moving at a maximum speed when it enters the gap between the guide walls 42, 44. As a result, the exemplary closure dampening bumper 34 provides the greatest dampening when the gooseneck 22 enters the gap between the guide walls 42, 44. The beam 66 narrows to the width 70 proximate to the base 36, corresponding to diminishing resistance to deformation. Further, the speed and energy of the gooseneck 22 diminishes as the gooseneck 22 moves closer to the base 36. Thus, the width of the beam 66 is arranged to provide greater resistance to deformation, corresponding to greater energy absorption, when the gooseneck 22 is at a maximum velocity and provides less resistance to deformation later in the motion stroke after the gooseneck 22 has been slowed.

With continued reference to FIGS. 1 and 2-4, the exemplary closure dampening bumper 34 also includes beams 64 and 68 having substantially constant width. As a result, a gap between the beams 62 and 64 is variable and a gap between the beams 66 and 68 is variable. The beams 62, 66 having variable width are positioned closer to the pivot axis 24 than the beams 64, 68 having substantially constant width. In the exemplary embodiment, this ensures that the gooseneck 22 will first interact with the relatively thicker beams 62, 66 upon entry into the gap between the guide walls 42, 44. However, by pairing beams of substantially constant width with beams of variable width, the exemplary embodiment demonstrates another approach to varying the dimensions of the beams to tune the dampening properties of a closure dampening bumper in alternative embodiments of the present disclosure.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A closure dampening bumper comprising:
   a base operable to define a stop-bumper for a moving structure;
   a pair of guide walls extending from the base and having respective inner and outer surfaces, the inner surfaces tapering outward from one another such that a distance between the inner surfaces increases from the base to respective distal ends of the guide walls, the pair of guide walls operable to receive the moving structure between the inner surfaces and guide the moving structure to the base; and
   a plurality of beams extending from the outer surfaces of the pair of guide walls, the plurality of beams elastically deformable to dampen energy associated with the moving structure during passage between the inner surfaces.

2. The closure dampening bumper of claim 1, wherein the plurality of beams and the pair of guide walls cooperate to dampen energy associated with the moving structure and reduce binding and rebounding of the moving structure.

3. The closure dampening bumper of claim 1, wherein the plurality of beams includes a similar number of beams extending from each of the outer surfaces.

4. The closure dampening bumper of claim 1, wherein the plurality of beams includes pairs of spaced beams extending from each of the outer surfaces.

5. The closure dampening bumper of claim 1, wherein the plurality of beams include at least one pair of spaced beams extending from one of the outer surfaces and wherein the at least one pair of spaced beams includes beams having different widths.

6. The closure dampening bumper of claim 1, wherein the plurality of beams include at least one beam having variable width.

7. The closure dampening bumper of claim 6, wherein the plurality of beams include at least one beam having substantially constant width.

8. The closure dampening bumper of claim 7, wherein the beam having variable width and the beam having substantially constant width extend from the same outer surface.

9. The closure dampening bumper of claim 6, wherein the beam having variable width narrows in a direction parallel to the outer surface.

10. The closure dampening bumper of claim 1, wherein the plurality of beams include at least one pair of spaced beams extending from one of the outer surfaces and wherein a gap between the at least one pair of spaced beams is variable.

11. A gooseneck hinge assembly including:
    a hinge box including a pair of side walls spaced from one another and operable to be connected to a vehicle;
    a gooseneck pivotally moveable about a pivot axis between the side walls and operable to be connected to a decklid of the vehicle; and
    a closure dampening bumper including:
       a base positioned between the side walls and defining a stop-bumper for the gooseneck,
       a pair of guide walls extending from the base and having respective inner and outer surfaces, the inner surfaces tapering outward from one another such that a distance between the inner surfaces increases from the base to respective distal ends of the guide walls, the pair of guide walls operable to receive and guide the gooseneck to the base during the pivoting movement, and
       a plurality of beams extending from the outer surfaces of each guide wall, the plurality of beams elastically deformable to dampen energy associated with the gooseneck during passage between the inner surfaces.

12. The gooseneck hinge assembly of claim 11, wherein the pair of guide walls are internal of and spaced from the pair of side walls.

13. The gooseneck hinge assembly of claim 11, wherein each of the plurality of beams is elastically deformable between the pair of guide walls and the pair of side walls when the gooseneck moves between the pair of guide walls.

14. The gooseneck hinge assembly of claim 11, wherein the base is internal of and spaced from the pair of side walls.

15. The gooseneck hinge assembly of claim 14, wherein the base is fixedly mounted to the hinge box.

16. The gooseneck hinge assembly of claim 11, wherein the plurality of beams include at least one beam having variable width with a widest portion of the at least one beam having variable width positioned proximate to a plane of entry of the gooseneck between the pair of guide walls.

17. The gooseneck hinge assembly of claim 11, wherein the plurality of beams include beams having variable width positioned on opposite outer surfaces, wherein the widest portions of the beams having variable width are positioned proximate to a plane of entry of the gooseneck between the pair of guide walls.

18. The gooseneck hinge assembly of claim 17, wherein the plurality of beams includes beams having substantially constant width positioned on opposite outer surfaces, each beam having substantially constant width adjacent to one of the beams having variable width, wherein the beams having variable width are positioned closer to the pivot axis than the beams having substantially constant width.

* * * * *